(12) United States Patent
Kamada et al.

(10) Patent No.: US 6,866,604 B2
(45) Date of Patent: Mar. 15, 2005

(54) MULTIPLE LEVEL SPROCKET SUPPORT FOR A BICYCLE

(75) Inventors: Kenji Kamada, Osaka (JP); Takanori Kanehisa, Sakai (JP)

(73) Assignee: Shimano, Inc., Sakai (JP)

( * ) Notice: Subject to any disclaimer, the term of this patent is extended or adjusted under 35 U.S.C. 154(b) by 261 days.

(21) Appl. No.: 10/346,813

(22) Filed: Jan. 17, 2003

(65) Prior Publication Data

US 2004/0142782 A1 Jul. 22, 2004

(51) Int. Cl.⁷ .............................................. F16H 9/00
(52) U.S. Cl. ...................................... 474/160; 474/152
(58) Field of Search ......................... 474/78, 160, 902, 474/903, 152, 158; 74/594.1

(56) References Cited

U.S. PATENT DOCUMENTS

| | | | | |
|---|---|---|---|---|
| 4,353,447 A | * | 10/1982 | Bes | 192/64 |
| 5,782,712 A | | 7/1998 | Campagnolo | |
| 5,935,034 A | | 8/1999 | Campagnolo | |
| 5,954,604 A | * | 9/1999 | Nakamura | 474/160 |
| 6,264,575 B1 | * | 7/2001 | Lim et al. | 474/77 |
| 6,382,381 B1 | * | 5/2002 | Okajima et al. | 192/64 |
| 6,428,437 B1 | * | 8/2002 | Schlanger | 474/160 |
| 2002/0033635 A1 | | 3/2002 | Meggiolan | |
| 2003/0171180 A1 | * | 9/2003 | Shahana et al. | 474/152 |
| 2004/0142783 A1 | * | 7/2004 | Kamada et al. | 474/160 |

* cited by examiner

Primary Examiner—David A. Bucci
Assistant Examiner—Vicky A. Johnson
(74) Attorney, Agent, or Firm—James A. Deland (57) ABSTRACT

A sprocket support for a bicycle includes a first outer peripheral surface portion and a second outer peripheral surface portion. The first outer peripheral surface portion is adapted to support an inner peripheral surface of a first sprocket for rotation around an axis, wherein the first outer peripheral surface portion defines at least one radially inwardly extending spline and at least one radially outwardly extending spline. The at least one radially inwardly extending spline has a radially inner surface with a first radially inner distance from the axis, and the at least one radially outwardly extending spline has a radially outer surface with a first radially outer distance from the axis. The second outer peripheral surface portion is adapted to support an inner peripheral surface of a second sprocket for rotation around the axis, wherein the second outer peripheral surface portion defines at least one radially inwardly extending spline and at least one radially outwardly extending spline. The at least one radially inwardly extending spline has a radially inner surface with a second radially inner distance from the axis, and the at least one radially outwardly extending spline has a radially outer surface with a second radially outer distance from the axis. The first radially outer distance is greater than the second radially inner distance and is smaller than the second radially outer distance.

21 Claims, 12 Drawing Sheets

MULTIPLE LEVEL SPROCKET SUPPORT FOR A BICYCLE

BACKGROUND OF THE INVENTION

The present invention is directed to bicycles and, more particularly, to various features of a bicycle sprocket apparatus.

Bicycle transmissions usually comprise either internally mounted transmissions or externally mounted transmissions. Internally mounted transmissions usually have a planetary gear mechanism built into a rotating hub (e.g., one of the bicycle wheels), and a chain is used to drive a sprocket coupled to the planetary gear mechanism. A clutch mechanism is coupled to the planetary gear transmission to select a desired speed step, and the rider operates a shift control device to control the clutch mechanism. Externally mounted transmissions usually have a derailleur for switching a chain among a plurality of external sprockets, and the rider operates a shift control device to control the derailleur. Some applications combine the features of internally mounted transmissions and externally mounted transmissions by coupling a plurality of sprockets to the hub-mounted planetary gear mechanism and by using a derailleur to shift the chain among the plurality of sprockets. Such an arrangement multiplies the number of available speed steps. A shift control device operated by the rider is used to control the clutch mechanism and the derailleur. In any event, it is always desirable to mount the one or more sprockets in an advantageous manner.

SUMMARY OF THE INVENTION

The present invention is directed to bicycles and, more particularly, to various features of a bicycle sprocket apparatus. In one embodiment, a sprocket support for a bicycle includes a first outer peripheral surface portion and a second outer peripheral surface portion. The first outer peripheral surface portion is adapted to support an inner peripheral surface of a first sprocket for rotation around an axis, wherein the first outer peripheral surface portion defines at least one radially inwardly extending spline and at least one radially outwardly extending spline. The at least one radially inwardly extending spline has a radially inner surface with a first radially inner distance from the axis, and the at least one radially outwardly extending spline has a radially outer surface with a first radially outer distance from the axis. The second outer peripheral surface portion is adapted to support an inner peripheral surface of a second sprocket for rotation around the axis, wherein the second outer peripheral surface portion defines at least one radially inwardly extending spline and at least one radially outwardly extending spline. The at least one radially inwardly extending spline has a radially inner surface with a second radially inner distance from the axis, and the at least one radially outwardly extending spline has a radially outer surface with a second radially outer distance from the axis. The first radially outer distance is greater than the second radially inner distance and is smaller than the second radially outer distance.

Additional inventive features will become apparent from the description below, and such features alone or in combination with the above features may form the basis of further inventions as recited in the claims and their equivalents.

DETAILED DESCRIPTION OF THE EMBODIMENTS

Figure 1:
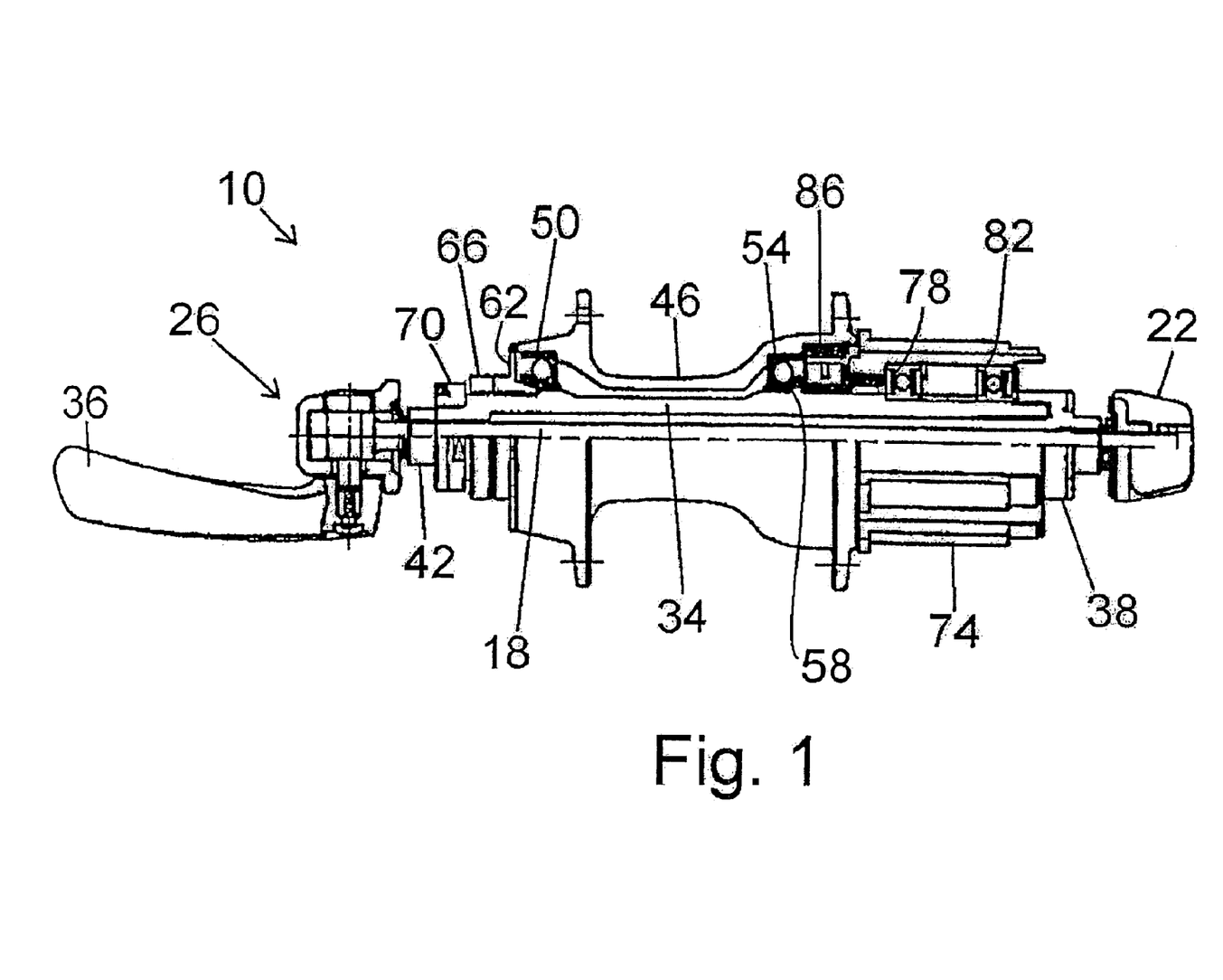
FIG. 1 is a partial cross-sectional view of a bicycle hub that employs a particular embodiment of a sprocket support.

FIG. 1 is a partial cross-sectional view of a bicycle hub 10 that may be mounted, for example, to a rear frame portion of a bicycle (not shown). Hub 10 includes an axle assembly comprising an axle 18, a fixing nut 22 that threadingly engages one end of axle 18, and a cam nut assembly 26 that engages the other end of axle 18 so that rotation of a cam lever 30 reduces the axial distance between fixing nut 22 and cam nut assembly 26 and thereby fixes hub 10 to the bicycle in a known manner. An axle shaft 34 surrounds axle 18. Axle shaft 34 is held on axle 18 by a retainer 38 and the end 42 of axle shaft 34 itself. A hub shell 46 is rotatably supported on axle shaft 34 by bearing assemblies 50 and 54, wherein bearing assembly 50 is axially fixed by a sloping surface 58 on axle shaft 34, and bearing assembly 54 is axially fixed by a retainer 62, a spacer 66 and a lock nut 70 disposed on axle shaft 34. A sprocket support 74 is rotatably supported on axle shaft 34 by bearing assemblies 78 and 82 and axially supported by retainer 38 in a known manner. Sprocket support 74 also is coupled to hub shell 46 through a one-way ratchet and pawl mechanism 86 in a known manner so that sprocket support 74 rotates relative to hub shell 46 in only one direction.

Figure 2A:
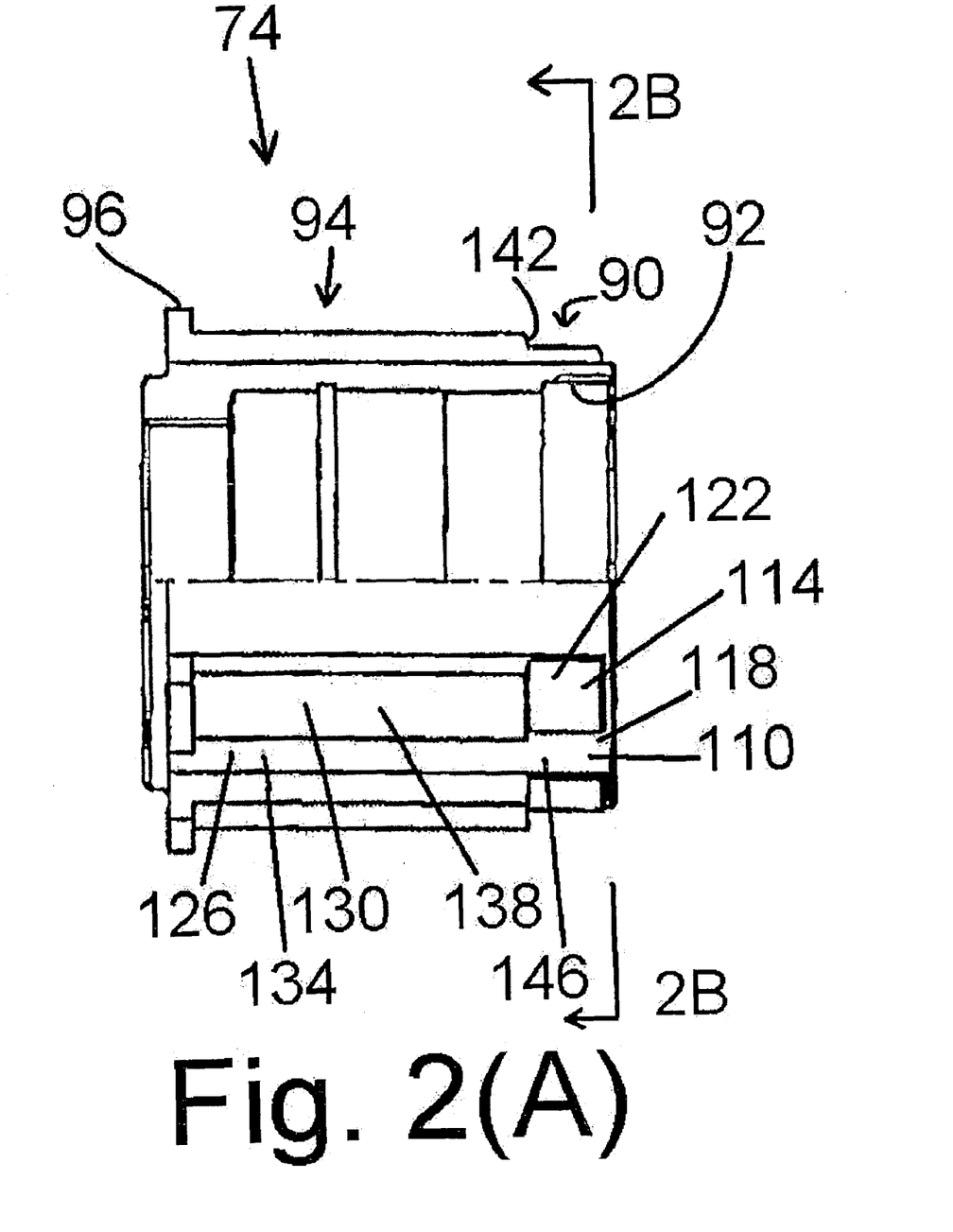
FIG. 2(a) is a partial cross-sectional view of a particular embodiment of the sprocket support.
Figure 2B:
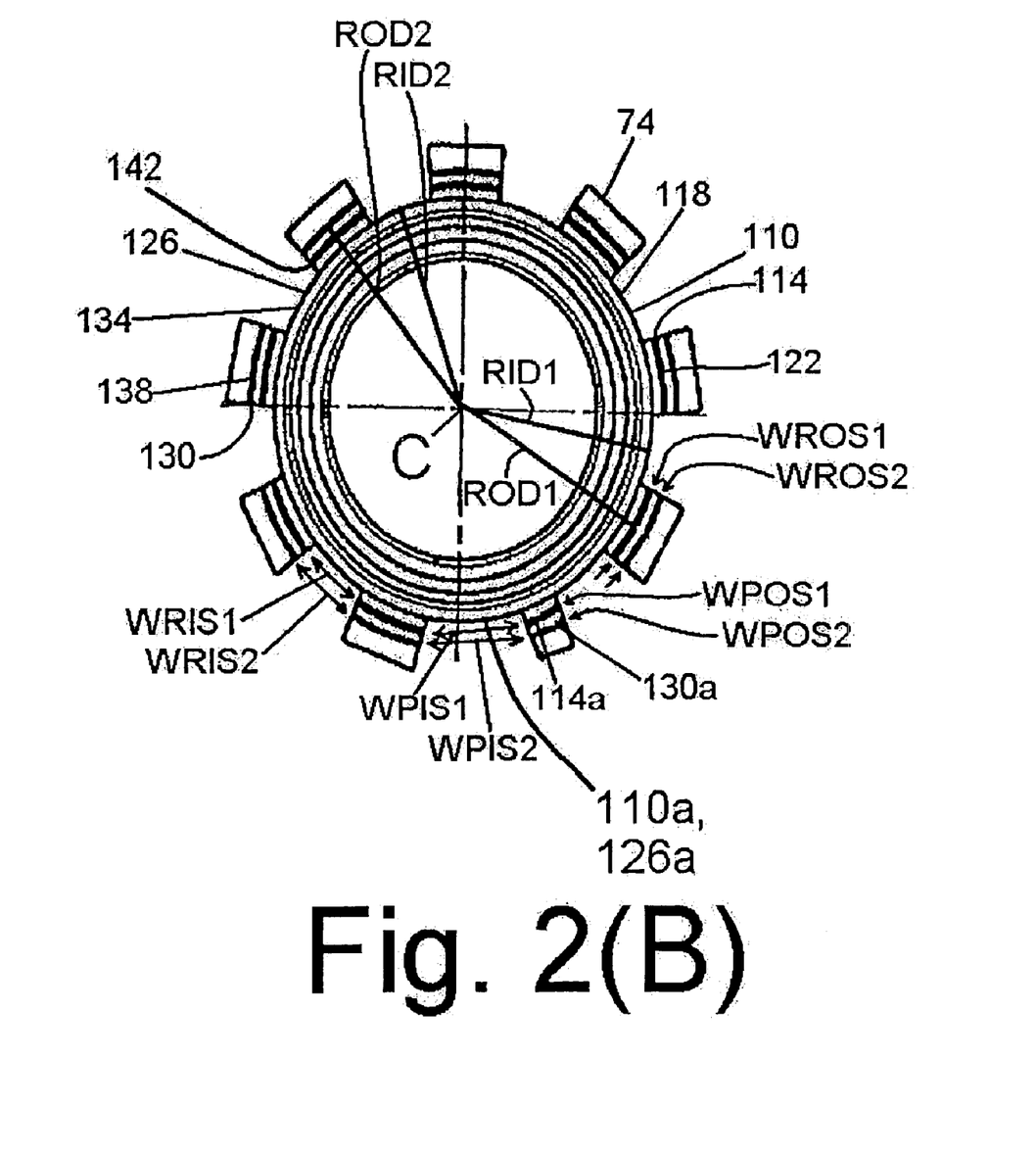
FIG. 2(b) is a view taken along line 2(b)–2(b) in FIG. 2(a)

FIG. 2(a) is a partial cross-sectional view of a particular embodiment of sprocket support 74, and FIG. 2(b) is a view taken along line 2b–2b in FIG. 2(a). As shown in those figures, sprocket support 74 comprises a first outer peripheral surface portion 90 with an internally threaded portion 92, a second outer peripheral surface portion 94, and a flange portion 96. First outer peripheral surface portion 90 is adapted to support an inner peripheral surface of a first sprocket (e.g., sprocket 200 shown in FIGS. 3(a)–3(c)) such that first outer peripheral surface portion 90 rotates around an axis defined by axle 18, the center of which is indicated by the reference letter C in FIG. 2(b). Similarly, second outer peripheral surface portion 94 is adapted to support an inner peripheral surface of a second sprocket (e.g., sprocket 300 shown in FIGS. 4(a)–4(c)) such that second outer peripheral surface portion 94 also rotates around the axis defined by axle 18.

First outer peripheral surface portion 90 defines a plurality of radially inwardly extending splines 110 and a plurality of radially outwardly extending splines 114, wherein each of the plurality of radially inwardly extending splines 110 has a radially inner surface 118 with a first radially inner distance RID1 from center C, and wherein each of the plurality of radially outwardly extending splines 114 has a radially outer surface 122 with a first radially outer distance ROD1 from center C. Similarly, second outer peripheral surface portion 94 defines a plurality of radially inwardly extending splines 126 and a plurality of radially outwardly extending splines 130, wherein each of the plurality of radially inwardly extending splines 126 has a radially inner surface 134 with a second radially inner distance RID2 from center C, and wherein each of the plurality of radially outwardly extending splines 130 has a radially outer surface 138 with a second radially outer distance ROD2 from center C. It should be clear from the drawings that the distance RID1 is substantially equal to the distance RID2, whereas the distance ROD1 is less than the distance ROD2. Furthermore, the distance ROD1 for each of the plurality of radially outwardly extending splines 114 is the same, and the distance ROD2 for each of the plurality of radially outwardly extending splines 130 is the same. Of course, such relationships are not necessary, and in other embodiments there may be any number of distances RID1 substantially equal to RID2, no distances RID1 substantially equal to RID2, any number of distances ROD1 less than the distances ROD2, no distance ROD1 less than ROD2, or any combination of distances that is desirable to suit the application.

A transition surface portion 142 extends radially between each of the radially outwardly extending splines 114 of the first outer peripheral surface portion 90 and its corresponding radially outwardly extending spline 130 of the second outer peripheral surface portion 94. In this embodiment, each transition surface portion 142 is perpendicular to both the radially outer surface 122 of its corresponding radially outwardly extending spline 114 and the radially outer surface 138 of its corresponding radially outwardly extending spline 130. Since there is no radially outwardly extending surface between the radially inwardly extending splines 110 of the first outer peripheral surface portion 90 and the radially inwardly extending splines 126 of the second outer peripheral surface portion 94 in this embodiment, a phantom transition surface portion 146 indicated by the phantom line in FIG. 2(a) may be assumed to exist at the same axial position as the transition surface portions 142 of each circumferentially adjacent pair of radially outwardly extending splines 114 and 130. Each phantom transition surface portion 146 can be considered a junction between a radially inwardly extending spline 110 of first outer peripheral surface portion 90 and its corresponding radially inwardly extending spline 126 of the second outer peripheral surface portion 94. Of course, in other embodiments the phantom transition surface portion 146 may have a visibly distinct axial width, in which case the junction between each radially inwardly extending spline 110 of first outer peripheral surface portion 90 and its corresponding radially inwardly extending spline 126 of the second outer peripheral surface portion 94 will be readily apparent.

In this embodiment, each radially outwardly extending spline 114 of first outer peripheral surface portion 90 at least partially overlaps a corresponding radially outwardly extending spline 130 of second outer peripheral surface portion 94 when viewed in a direction perpendicular to the transition surface portion 142 (i.e., the view shown in FIG. 2(b)). More specifically, each radially outwardly extending spline 114 completely overlaps its corresponding radially outwardly extending spline 130 in the circumferential direction when viewed in a direction perpendicular to the transition surface portion 142. Of course, such a relationship is not necessary, and the degree of overlap, if any, may change depending on the application. Furthermore, in this embodiment, the circumferential width WROS1 of each radially outwardly extending spline 114 is the same, and the circumferential width WROS2 of each radially outwardly extending spline 130 is the same. Also, the circumferential width WROS1 of each radially outwardly extending spline 114 is substantially equal to the circumferential width WROS2 of its corresponding radially outwardly extending spline 130. Thus, each radially outwardly extending spine 114 completely aligns with its corresponding radially outwardly extending spline 130 in the circumferential direction. Of course, such relationships are not necessary, and they may change depending upon the application. Such relationships between WROS1 and WROS2 also bring about corresponding relationships to the circumferential widths WRIS1 and WRIS2 of radially inwardly extending splines 110 and 126, respectively. This configuration of sprocket support 74 is shown in FIG. 2(b).

In this embodiment, at least one of the plurality of radially outwardly extending splines 114, such as spline 114a, has a different circumferential width WPOS1 than another one of the plurality of radially outwardly extending splines 114, and at least one of the plurality of radially outwardly extending splines 130, such as spline 130a, has a different circumferential width WPOS2 than another one of the plurality of radially outwardly extending splines 130. Similarly, at least one of the plurality of radially inwardly extending splines 110, such as spline 110a, has a different circumferential width WPIS1 than another one of the plurality of radially inwardly extending splines 110, and at least one of the plurality of radially inwardly extending splines 126, such as spline 126a has a different circumferential width WPIS2 than another one of the plurality of radially inwardly extending splines 126. This allows the sprockets mounted on sprocket support 74 to be positioned at predetermined rotational positions in a manner described below.

Figures 3A, 3B:
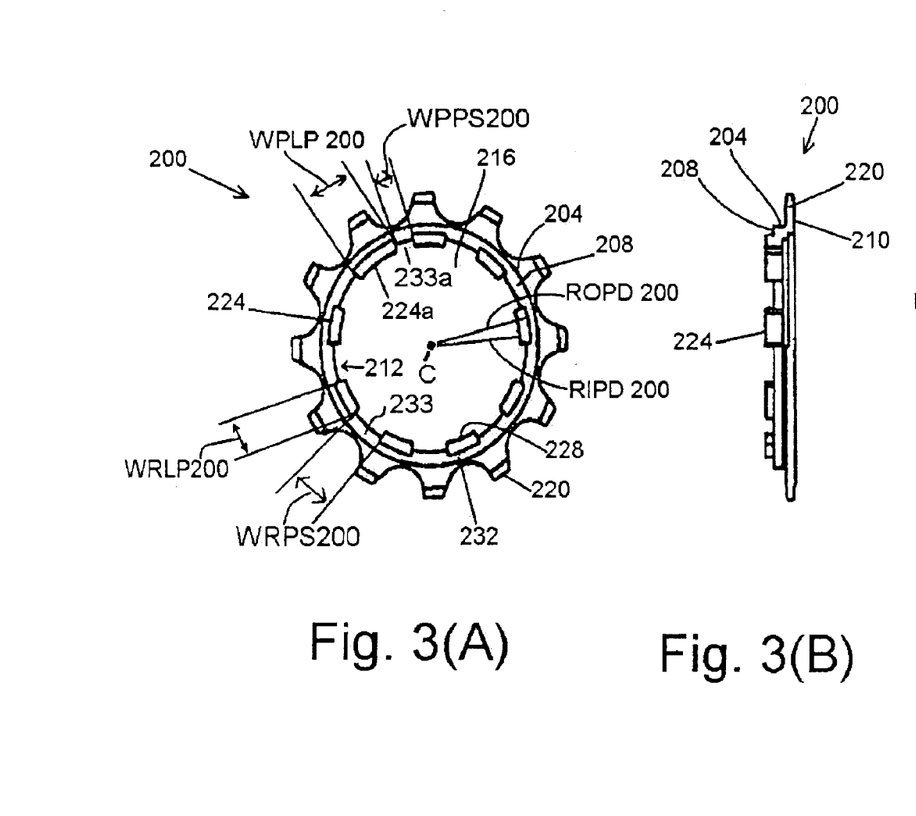
FIG. 3(a) is a rear view of a particular embodiment of a twelve-tooth sprocket.
FIG. 3(b) is a partial cross-sectional side view of the sprocket shown in FIG. 3(a)
Figure 3C:
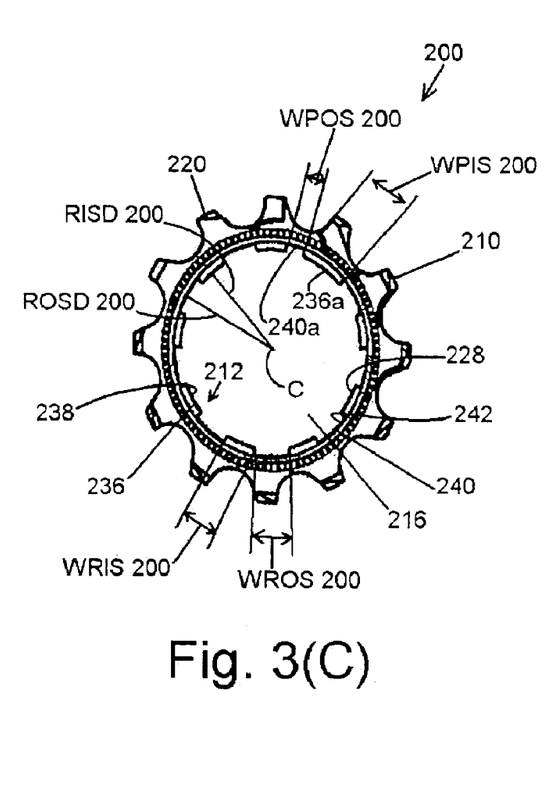
FIG. 3(c) is a front view of the sprocket shown in FIG. 3(a)

FIG. 3(a) is a rear view of a particular embodiment of a twelve-tooth sprocket 200, FIG. 3(b) is a partial cross-sectional side view of sprocket 200, and FIG. 3(c) is a front view of sprocket 200. In this embodiment, sprocket 200 is adapted to be installed on one of the first outer peripheral surface portion 90 or second outer peripheral surface portion 94 of sprocket support 74. More specifically, sprocket 200 is adapted to be installed on first outer peripheral surface portion 90 of sprocket support 74. Sprocket 200 comprises a sprocket body 204 having side surface 208 and 210 and an inner peripheral surface 212. Inner peripheral surface 212 defines a sprocket mounting opening 216, wherein at least one portion of the inner peripheral surface 212 is adapted to contact sprocket support 74. In this embodiment, the entire inner peripheral surface 212 contacts the sprocket support 74. Sprocket 200 further comprises a plurality of sprocket teeth 220 extending radially outwardly from the sprocket body 204, wherein the lower portion of sprocket body 204 is axially offset (to the left in FIG. 3(b)) from the plurality of sprocket teeth 220.

At least one lateral projection or spline 224 extends laterally from the side surface 208 of the sprocket body 204 in close proximity to the at least one portion of the inner peripheral surface 212 that is adapted to contact the sprocket support 74. In this embodiment, there is a plurality of such projections 224 with a lateral projection space 233 between each adjacent pair of lateral projections. Each lateral projection 224 has a radially inner surface 228 and a radially outer surface 232. Inner peripheral surface 212 of sprocket 200 also defines at least one radially inwardly extending spline 236 and one radially outwardly extending spline 240. In this embodiment, there is a plurality of such radially inwardly extending splines 236 and radially outwardly extending splines 240. Each radially inwardly extending spline 236 has a radially inner surface 238, and each radially outwardly extending spline 240 has a radially outer surface 242. In this embodiment, there are nine lateral projections 224, radially inwardly extending splines 236 and radially outwardly extending splines 240, wherein each lateral projection 224 and radially inwardly extending spline 236 alternates with a corresponding radially outwardly extending spline 240. Each lateral projection 224 at least partially overlaps or aligns with a corresponding radially inwardly extending spline 236 when viewed in a direction perpendicular to side surface 208 (i.e., in the direction shown in FIG. 3(a)). In this embodiment, each lateral projection 224 completely overlaps and aligns with its corresponding radially inwardly extending spline 236, and each lateral projection space 233 aligns with its corresponding radially outwardly extending spline 240 when viewed in a direction perpendicular to side surface 208, but in other embodiments there may be only a partial overlap or alignment for some lateral projections 224 and radially inwardly extending splines 236, or no overlap or alignment at all for other lateral projections 224 and radially inwardly extending splines 236. In fact, the number of lateral projections 224 need not be the same as either the number of radially inwardly extending splines 236 or radially outwardly extending splines 240. Such an embodiment will be discussed below with respect to FIGS. 7(a)–7(c).

In general, a circumferential width WRLP200 of at least one lateral projection 224 is substantially the same as a circumferential width WRIS200 of at least one of the radially inwardly extending splines 236. In this embodiment, a circumferential width WRLP200 of each lateral projection 224 is substantially the same as the circumferential width WRIS200 of its corresponding radially inwardly extending spline 236. Furthermore, the circumferential widths WRLP200 of all of the lateral projections 224 are the same except for a circumferential width WPLP200 of a lateral positioning projection 224, and the circumferential widths WRPS200 of all of the lateral projection spaces 233 are the same except for a circumferential width WPPS200 of a lateral projection space 233a. The circumferential widths WRIS200 of all of the radially inwardly extending splines 236 are the same except for a circumferential width WPIS200 of a radially inwardly extending positioning spline 236a, and the circumferential widths WROS200 of all of the radially outwardly extending splines 240 are the same except for a circumferential width WPOS200 of a radially outwardly extending positioning spline 240a.

In this embodiment, a distance RIPD200 of the radially inner surface 228 of at least one lateral projection 224 from the center C of the sprocket 200 is substantially the same as a distance RISD200 of the radially inner surface 238 of at least one radially inwardly extending spline 236 from the center C of the sprocket 200. More specifically, the distance RIPD200 of the radially inner surface 228 of each of the plurality lateral projections 224 from the center C of the sprocket 200 is substantially the same, and the distance RISD200 of the radially inner surface 238 of each of the plurality of radially inwardly extending splines 236 from the center C of the sprocket 200 is the same. Consequently, the distance RIPD200 of the radially inner surface 228 of each of the plurality of lateral projections 225 from the center C of sprocket 200 is substantially the same as the distance RISD200 of the inner surface 238 of each of the plurality of radially inwardly extending splines 236 from the center C of sprocket 200.

In this embodiment, a distance ROPD200 of the radially outer surface 232 of at least one lateral projection 224 from the center C of the sprocket 200 is greater than a distance ROSD200 of the radially outer surface 242 of at least one radially outwardly extending spline 240 from a center C of the sprocket 200. More specifically, the distance ROPD200 of the radially outer surface 232 of each of the plurality of lateral projections 224 from the center C of the sprocket 200 is substantially the same, and the distance ROSD200 of the radially outer surface 242 of each of the plurality of radially outwardly extending splines 240 from the center C of the sprocket 200 is substantially the same. Consequently, the distance ROPD200 of each radially outer surface 232 of the plurality of lateral projections 224 from the center C of sprocket 200 is greater than the distance ROSD200 of the outer surface 242 of each of the plurality of radially outwardly extending splines 240 from the center C of sprocket 200.

Figure 4A:
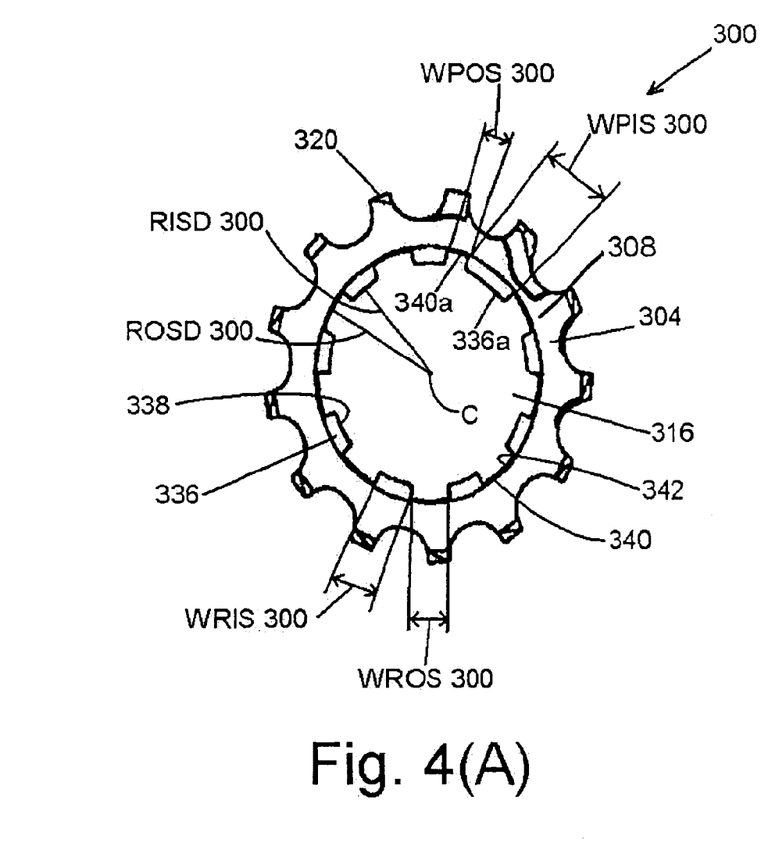
FIG. 4(a) is a front view of a particular embodiment of a thirteen-tooth sprocket.
Figure 4B:
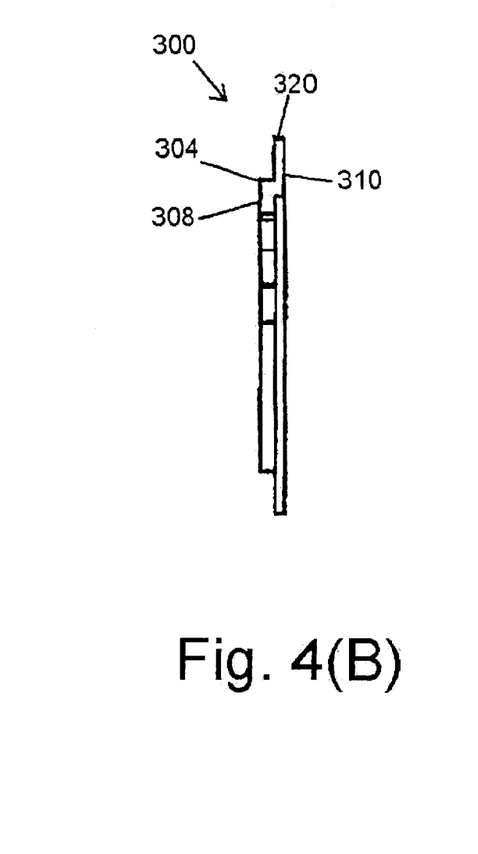
FIG. 4(b) is a partial cross-sectional side view of the sprocket shown in FIG. 4(a)

FIG. 4(a) is a front view of a particular embodiment of a thirteen-tooth sprocket 300, and FIG. 4(b) is a partial cross-sectional view of sprocket 300. In this embodiment, sprocket 300 is adapted to be installed on either one of the first outer peripheral surface portion 90 or second outer peripheral surface portion 94 of sprocket support 74. Sprocket 300 comprises a sprocket body 304 having side surface 308 and 310 and an inner peripheral surface 312 defining a sprocket mounting opening 316, wherein at least one portion of the inner peripheral surface 312 is adapted to contact sprocket support 74. In this embodiment, the entire inner peripheral surface 312 contacts the sprocket support 74. Sprocket 300 further comprises a plurality of sprocket teeth 320 extending radially outwardly from the sprocket body 304, wherein the lower portion of sprocket body 304 is axially offset from the plurality of sprocket teeth 320 (to the left in FIG. 4(b)).

Inner peripheral surface 312 of sprocket 300 also defines at least one radially inwardly extending spline 336 and one radially outwardly extending spline 340. In this embodiment, there is a plurality of such radially inwardly extending splines 336 and radially outwardly extending splines 340. Each radially inwardly extending spline 336 has a radially inner surface 338, and each radially outwardly extending spline has a radially outer surface 342. In this embodiment, there are nine radially inwardly extending splines 336 and nine radially outwardly extending splines 340, wherein each radially inwardly extending spline 336 alternates with a corresponding radially outwardly extending spline 340.

In this embodiment, the circumferential width WRIS300 of each of the plurality of radially inwardly extending splines 336 is the same except for a circumferential width WPIS300 of a radially inwardly extending positioning spline 336a. Also, the circumferential width WROS300 of each of the plurality of radially outwardly extending splines 340 is the same except for a circumferential width WPOS300 of a radially outwardly extending positioning spline 340a.

In this embodiment, the distance RISD300 of the radially inner surface 338 of each of the plurality of radially inwardly extending splines 336 from the center C of sprocket 300 is the same, and the distance ROSD300 of the radially outer surface 342 of each of the plurality of radially outwardly extending splines 340 from the center C of sprocket 300 is the same. Furthermore, the distances RISD200 of sprocket 200 and RISD300 of sprocket 300 are the same. Since the distances RID1 and RID2 of sprocket support 74 are the same, and assuming that the distances RID1, RID2, RISD200 and RISD300 are the same, then the radially inwardly extending splines 110 and 126 of first outer peripheral surface portion 90 and second outer peripheral surface portion 94 of sprocket support 74, respectively, can accommodate the radially inwardly extending splines 236 and 336 of both sprockets 200 and 300, respectively. However, as noted below, in his embodiment sprocket 200 will not be mounted to the second outer peripheral surface portion 94 of sprocket support 74.

As noted previously, the distance ROSD200 of the radially outer surface 242 of each of the plurality of radially outwardly extending splines 240 from the center C of sprocket 200 is the same, and the distance ROSD300 of the radially outer surface 342 of each of the plurality of radially outwardly extending splines 340 from the center C of the sprocket 300 is the same. It can be assumed that the distance ROSD200 of the radially outer surface 242 of each of the plurality of radially outwardly extending splines 240 from the center C of sprocket 200 is substantially equal to the distance ROD1 of the radially outer surface 122 of each of the plurality of radially outwardly extending splines 114 from the center C of sprocket support 74, and that the distance ROSD300 of the radially outer surface 342 of each of the plurality of radially outwardly extending splines 340 from the center C of sprocket 300 is substantially equal to the distance ROD2 of the radially outer surface 138 of each of the plurality of radially outwardly extending splines 130 from the center C of sprocket support 74. However, the distance ROSD200 of sprocket 200 is less than the distance ROSD300 of sprocket 300, and the distance ROD1 of sprocket support 74 is less than the distance ROD2 of sprocket support 74. As a result, sprocket 300 may be mounted on either the first outer peripheral surface portion 90 or the second outer peripheral surface portion 94 of sprocket support 74, which allows for interchangeability of sprockets and/or greater flexibility of sprocket positioning. On the other hand, because of the smaller distance ROSD200 of sprocket 200 relative to the larger distance ROD2 of the second outer peripheral surface portion 94 of sprocket support 74, sprocket 200 typically will not be mounted to second outer peripheral surface portion 94 of sprocket support 74. Of course, that need not be the case in other embodiments.

In known sprocket supports, RID1=RID2, and the sprocket support is made of steel or light alloy. When the sprocket support is made of steel, then the gap ROD1–RID1 is rather small, but since the strength of the steel is strong, the mesh between the splines of the sprocket support and the splines of the sprocket remain adequate. However, if the sprocket support is made of light alloy, then the gap is too narrow and the sprocket tends to shear off the splines on the sprocket support. To overcome this problem, the gap ROD1–RID1 is made greater, and new sprockets are designed to match the new spline distances of the sprocket support. However, if RID1 is made smaller than existing sprocket supports, then the new sprockets cannot be used with existing sprocket supports, and interchangeability is destroyed. If ROD1 is made larger than existing sprocket supports, then the radial distances of the splines on the smaller sprockets must be increased accordingly, which lowers the strength of the smaller sprocket. With the sprocket support 74 disclosed herein, the first outer peripheral surface portion 90 is made with the same distances as known sprocket supports. However, rather than increase the radial distance of the small sprocket splines, the lateral projections 224 are used to strengthen the sprocket as described below.

Figure 5:
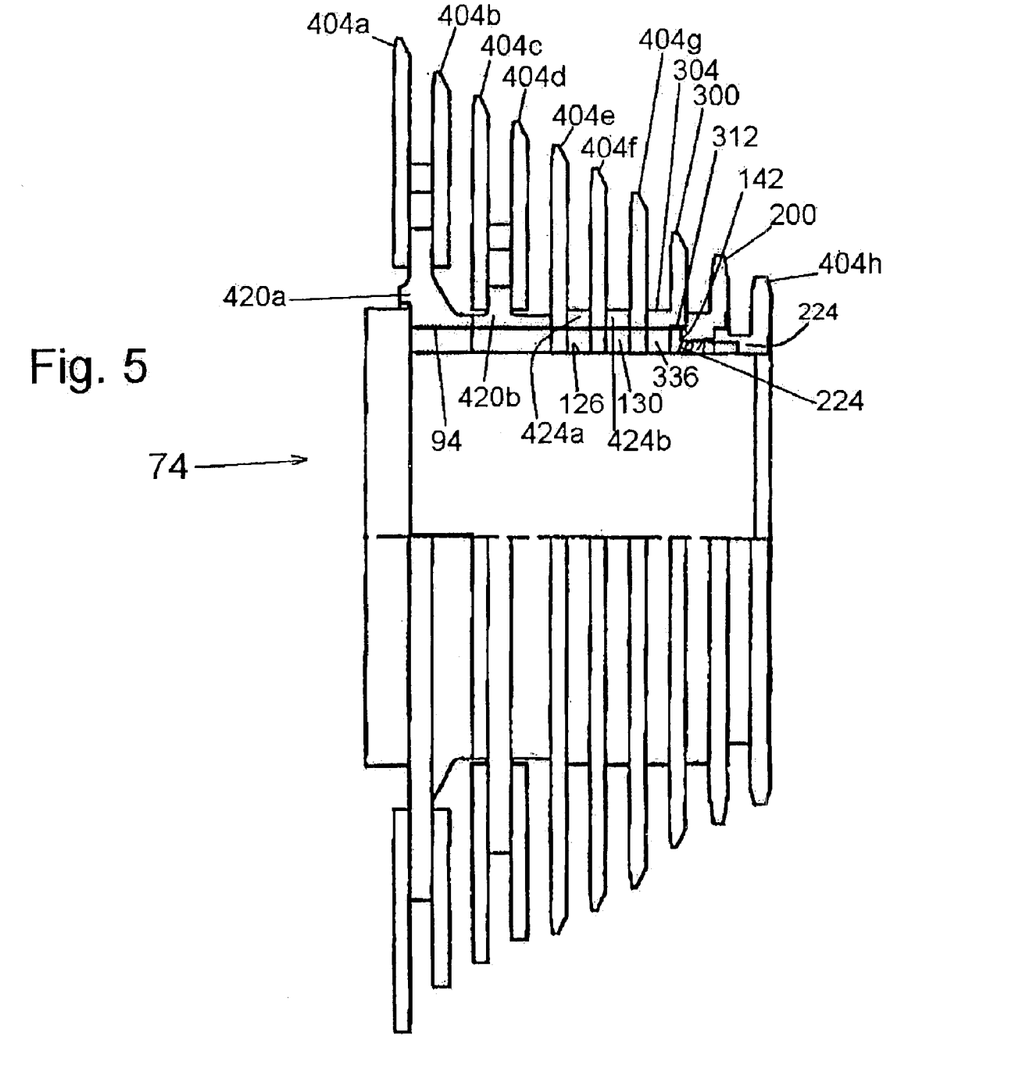
FIG. 5 is a partial cross-sectional view of an embodiment of a plurality of sprockets mounted on the sprocket support shown in FIGS. 2(a) and 2(b)

FIG. 5 is a partial cross-sectional view of an embodiment of a plurality of sprockets mounted on the sprocket support 74. In this embodiment, sprockets 404a and 404b having a varying number of teeth are mounted to the second outer peripheral surface portion 94 of sprocket support 74 through a sprocket adapter 420a, and sprockets 404c and 404d having a varying number of teeth are mounted to the second outer peripheral surface portion 94 of sprocket support 74 through a sprocket adapter 420b. Sprocket adapters 420a and 420b have radially inwardly extending splines and radially outwardly extending splines (including positioning splines, not shown) in the same manner as the radially inwardly extending splines 336, 336a and radially outwardly extending splines 340, 340a of sprocket 300. Another plurality of sprockets 404e, 404f and 404g having a varying number of teeth are directly mounted to the second outer peripheral surface portion 94 of sprocket support 74. The inner peripheral surface of sprockets 404e, 404f and 404g have radially inwardly extending splines and radially outwardly extending splines (including positioning splines, not shown) in the same manner as the radially inwardly extending splines 336, 336a and radially outwardly extending splines 340, 340a of sprocket 300. Sprockets 404e and 404f are axially separated from each other by a spacer 424a, and sprockets 404f and 404g are axially separated from each other by a spacer 424b.

In this embodiment, sprocket 300 is mounted on the second radially outer peripheral surface 94 of sprocket support 74, and the lower portion of sprocket body 304 of sprocket 300 abuts against the right side surface of sprocket 404g and functions as a spacer. Such a configuration also allows the radially inwardly extending splines 336 and 336a of sprocket 300 to have a greater axial thickness. The radially inwardly extending splines 336 of sprocket 300 completely engage the radially inwardly extending splines 126 of the second outer peripheral surface portion 94 of sprocket support 74 (i.e., the radially inner surfaces 338 of radially inwardly extending splines 336 almost or in fact contact the corresponding radially inner surfaces 134 of radially inwardly extending splines 126 of sprocket support 74). Furthermore, the radially inwardly extending positioning spline 336a of sprocket 300 completely engages the radially inwardly extending positioning spline 126a of sprocket support 74. Similarly, the radially outwardly extending splines 340 of sprocket 300 completely engage the radially outwardly extending splines 130 of the second outer peripheral surface portion 94 of sprocket support 74, and the radially outwardly extending spline 340a of sprocket 300 completely engages the radially outwardly extending spline 130a of sprocket support 74.

As shown in FIG. 5, sprocket 200 is mounted on the first radially outer peripheral surface 90 of sprocket support 74. In this configuration, the radially inwardly extending splines 236, 236a of sprocket 200 completely engage the respective radially inwardly extending splines 110, 110a of the first outer peripheral surface portion 90 of sprocket support 74, and the radially outwardly extending splines 240, 240a of sprocket 200 completely engage the respective radially outwardly extending splines 114, 114a of the first outer peripheral surface portion 90 of sprocket support 74. The lower portion of sprocket body 204 abuts against transition surface 142. Because the radially inwardly extending splines 336 of sprocket 300 are laterally offset from the plurality of sprocket teeth 320, the radially outer surfaces 232 of lateral projections 224 of sprocket 200 may extend under and contact the inner peripheral surface 312 of sprocket 300. This provides further support and stabilization for sprocket 300.

The shaded portion at sprocket 200 represents the engagement between the radially inwardly extending splines 110 of sprocket support 74 and the corresponding radially inwardly extending splines 236 of sprocket 200. The clear portion to the right of the shaded portion indicates the engagement between the radially outwardly extending splines 114 of sprocket support 74 and the corresponding radially outwardly extending splines 240 of sprocket 200. Because of the different circumferential widths 224a, 236a and 240a of the splines on sprocket 200 and the different circumferential widths 110a and 114a of the splines on sprocket support 74, sprocket 200 can be mounted on first outer peripheral surface portion 90 of sprocket support 74 in a predetermined rotational direction. This is very helpful when the various sprockets mounted on sprocket support 74 must have a predetermined rotational position relative to each other, such as when there are chain shift facilitating structures on the various sprockets. Another sprocket 404h (e.g., an eleven tooth sprocket) is attached to the laterally outermost end of sprocket support 74 using a convenient means such as an annular nut (not shown) that screws onto the threaded portion 92 of sprocket support 74.

Figure 6:
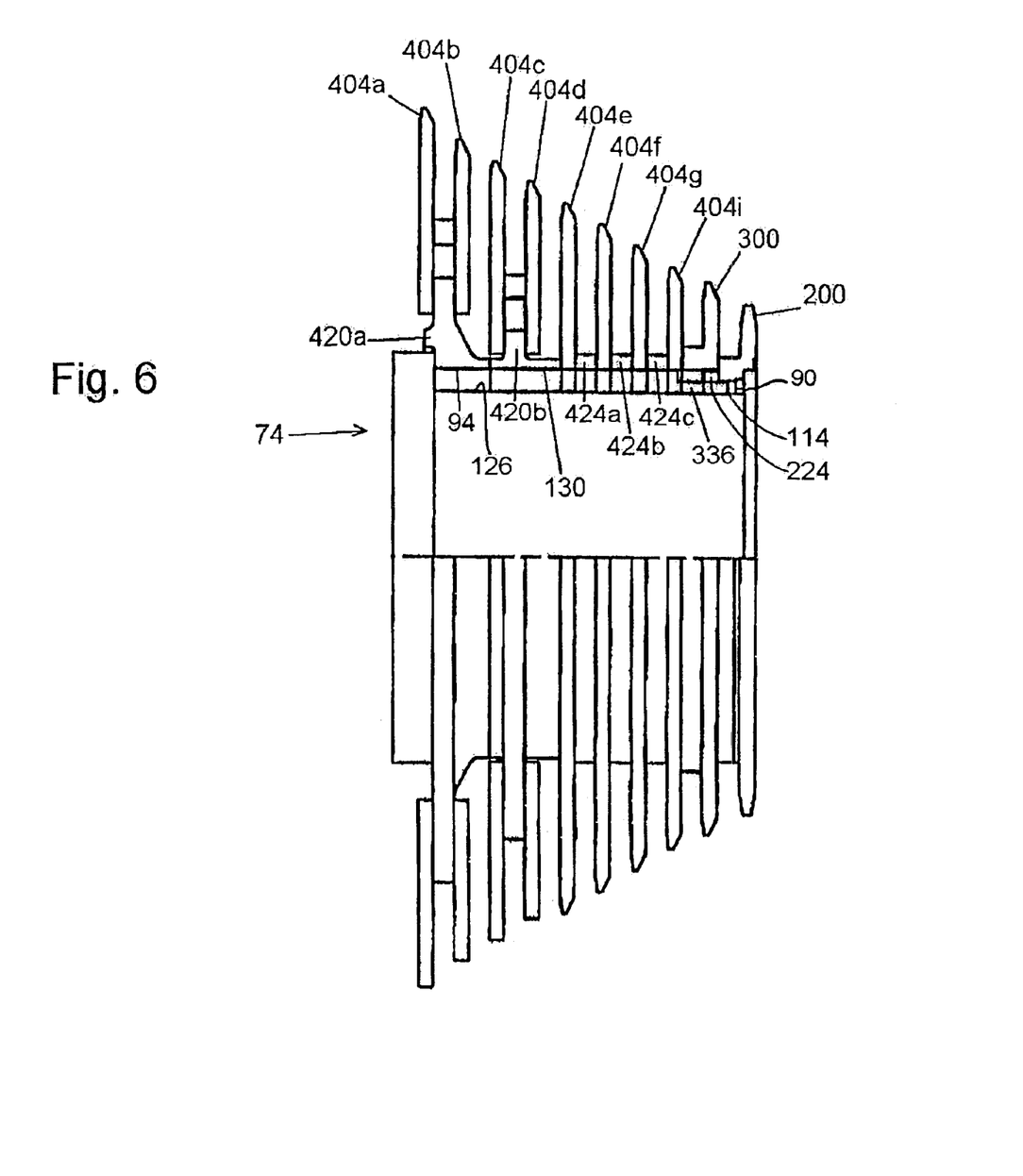
FIG. 6 is a partial cross-sectional view of an another embodiment of a plurality of sprockets mounted on the sprocket support shown in FIGS. 2(a) and 2(b)

FIG. 6 is a partial cross-sectional view of another embodiment of a plurality of sprockets mounted on the sprocket support 74. This embodiment is very similar to the embodiment shown in FIG. 5 in that it includes sprockets 404a–404g mounted to the second outer peripheral surface portion 94 of sprocket support 74. However, in this embodiment an extra sprocket 404i mounted to the second outer peripheral surface portion 94 of sprocket support 74, and both sprockets 200 and 300 are mounted on the first outer peripheral surface portion 90 of sprocket support 74. As noted above, this is possible because the distances RID1, RID2, RISD200 and RISD300 of the first outer peripheral surface 90 of sprocket support 74, the second outer peripheral surface 94 of sprocket support 74, sprocket 200 and sprocket 300, respectively, are the same, so the radially inwardly extending splines 110 of first outer peripheral surface portion 90 of sprocket support 74 can completely accommodate the radially inwardly extending splines 236 and 336 of both sprockets 200 and 300, respectively. The distance ROSD300 of sprocket 300 is greater than the distance ROSD200 of sprocket 200, and the distance ROD2 of the second outer peripheral surface 94 of sprocket support 74 is greater than the distance ROD1 of sprocket support 74. Thus, the radially outwardly extending splines 114 and 114a of the first outer peripheral surface portion 90 of sprocket support 74 can accommodate the radially outwardly extending splines 340 and 340a of sprocket 300, with a slight radial space between the radially outwardly extending splines 114 and 114a of sprocket support 74 and the radially outwardly extending splines 340 and 340a of sprocket 300. The added axial thickness of radially inwardly extending splines 340 help reinforce sprocket 300 in this position. Sprocket 200 may be mounted to the laterally outermost end of sprocket support 74 in the same manner as sprocket 404h in the embodiment shown in FIG. 5. Another sprocket or annular nut (not shown) may be screwed onto the threaded portion 92 of sprocket support 74 to axially fix the plurality of sprockets.

Figure 7A:
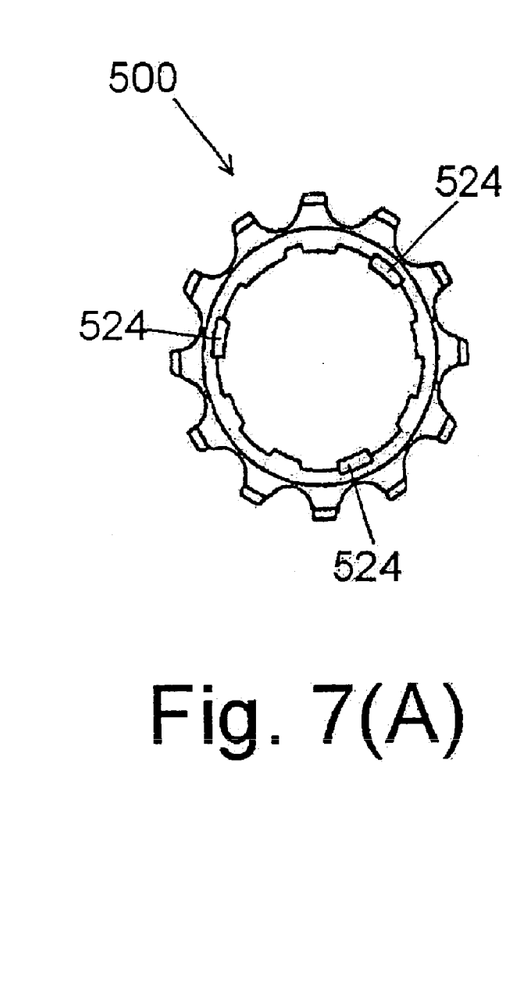
FIG. 7(a) is a rear view of another embodiment of a twelve-tooth sprocket.
Figure 7B:
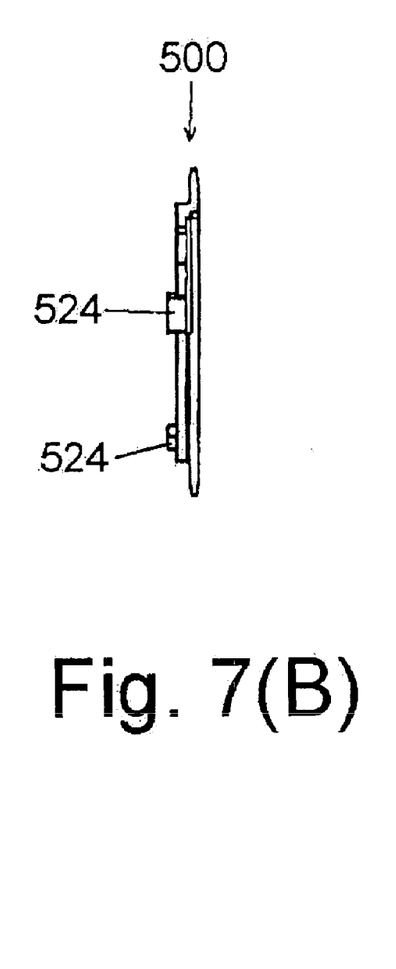
FIG. 7(b) is a partial cross-sectional side view of the sprocket shown in FIG. 7(a)
Figure 7C:
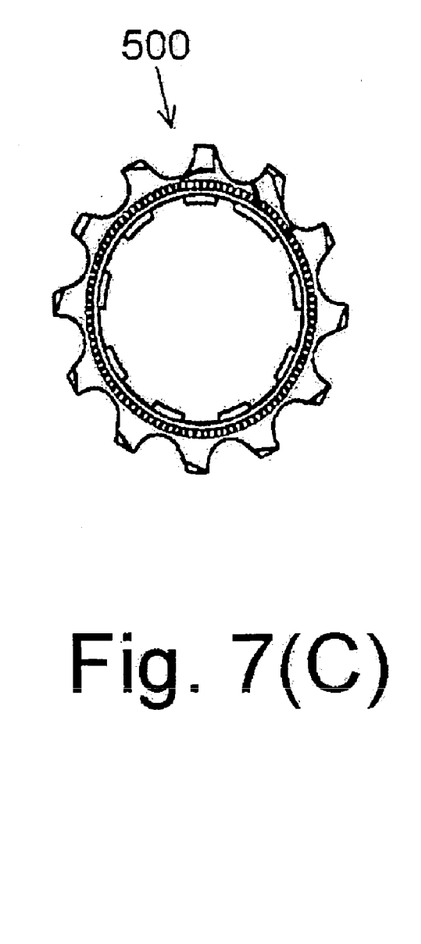
FIG. 7(c) is a front view of the sprocket shown in FIG. 7(a)

FIG. 7(a) is a rear view of another embodiment of a twelve-tooth sprocket 500, FIG. 7(b) is a partial cross-sectional view of sprocket 500, and FIG. 7(c) is a front view sprocket 500. Sprocket 500 is constructed the same as sprocket 200 shown in FIGS. 3(a)–3(c), except there are three evenly spaced lateral projections 524.

Figure 8:
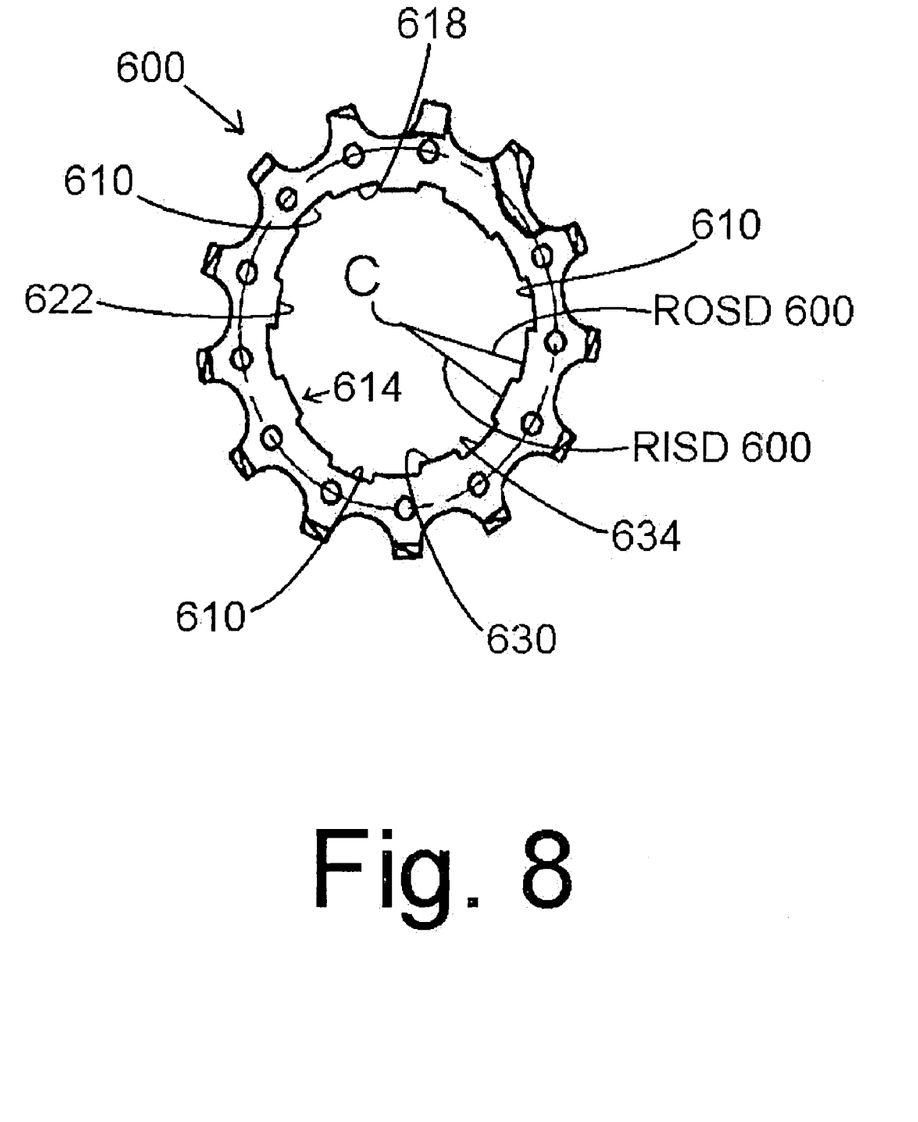
FIG. 8 is a front view of another embodiment of a thirteen-tooth sprocket.

FIG. 8 is a front view of another embodiment of a thirteen-tooth sprocket 600. Sprocket 600 may be used with sprocket 500 shown in FIGS. 7(a)–7(c), and it is adapted to be mounted on the first outer peripheral surface portion 90 of sprocket support 74. In this embodiment, there are three lateral projection-receiving recesses 610 that extend radially outwardly from an inner peripheral surface 614 of sprocket 600. More specifically, lateral projection receiving recesses 610 extend radially outwardly from radially outwardly extending splines 618 in locations where radially inwardly extending splines similar to radially inwardly extending splines 622 ordinarily would be located. Each lateral projection receiving recess 610 meshes with a corresponding lateral projection such as lateral projection 524 of sprocket 500 shown in FIGS. 7(a)–7(c). The lateral projections 524 of sprocket 500 support the inner peripheral surface 614 of sprocket 600 in those areas, thus increasing the ability of sprocket 600 to withstand stress. In this embodiment, the distances RISD600 and ROSD600 are the same as distances RISD200 and ROSD200, respectively, of sprocket 200.

Figure 9:
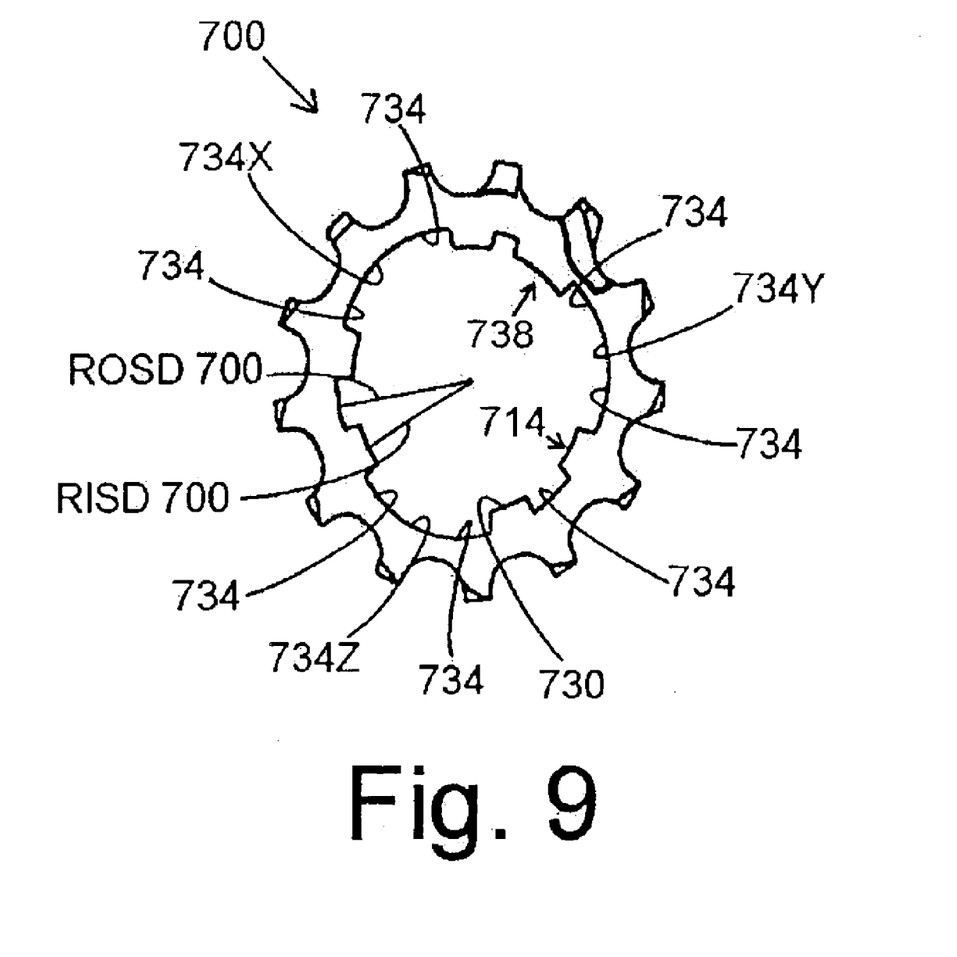
FIG. 9 is a front view of another embodiment of a thirteen-tooth sprocket.

FIG. 9 is a front view of another embodiment of a thirteen-tooth sprocket 700. Sprocket 700 also may be used with sprocket 500 shown in FIGS. 7(a)–7(c). However, in this embodiment, sprocket 700 is adapted to be mounted on either the first outer peripheral surface 90 of sprocket support 74 or the second outer peripheral surface portion 94 of sprocket support 74. Accordingly, the distances RISD700 and ROSD700 of radially inwardly extending splines 730 and radially outwardly extending splines 734 of sprocket 700, respectively, from the center C of sprocket 700 are the same as the distances RISD300 and ROSD300 of the corresponding splines in sprocket 300. However, radially outwardly extending splines 734 circumferentially merge at three locations, 734x, 734y and 734z of inner peripheral surface 714, and there are no radially inwardly extending splines 730 in those locations. When sprocket 700 is mounted to the second outer peripheral surface 94 of sprocket support 74, then there will be a corresponding space at locations 734x, 734y and 734z where these locations align with the corresponding radially inwardly extending splines 126 at those locations on sprocket support 74. On the other hand, when sprocket 700 is mounted on the first outer peripheral surface 90 of sprocket support 74, then the lateral projections 510 of sprocket 500 will fit beneath the inner peripheral surface 734 at those locations.

Figures 10A, 10B:
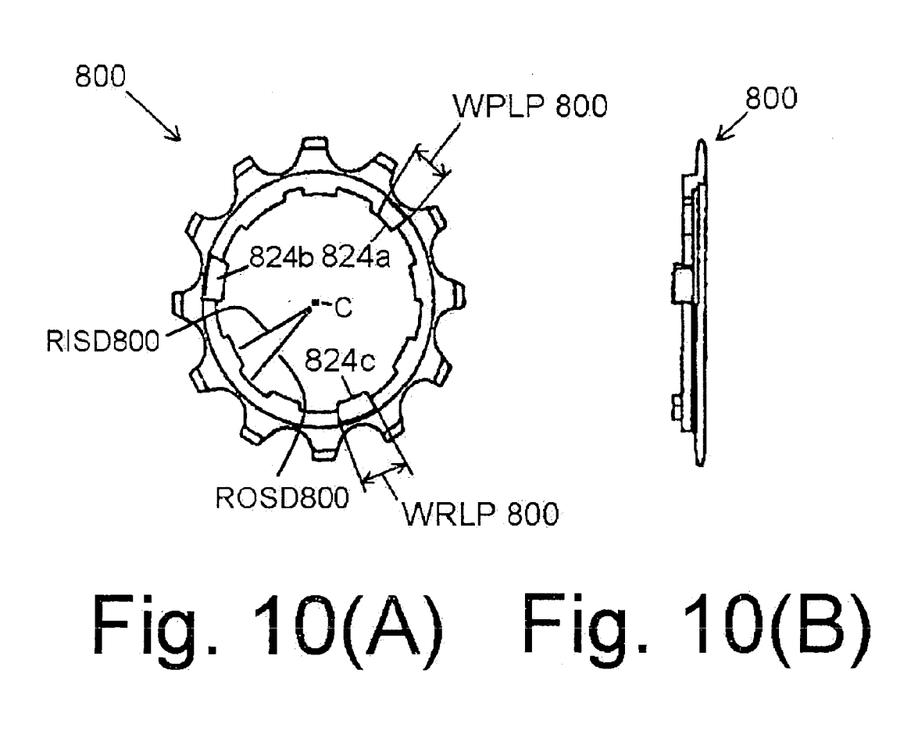
FIG. 10(a) is a rear view of another embodiment of a twelve-tooth sprocket.
FIG. 10(b) is a partial cross-sectional side view of the sprocket shown in FIG. 10(a)
Figure 10C:
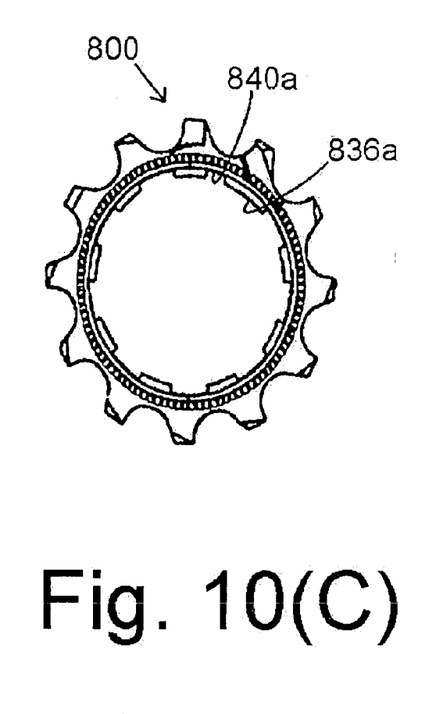
FIG. 10(c) is a front view of the sprocket shown in FIG. 10(a)
Figure 11:
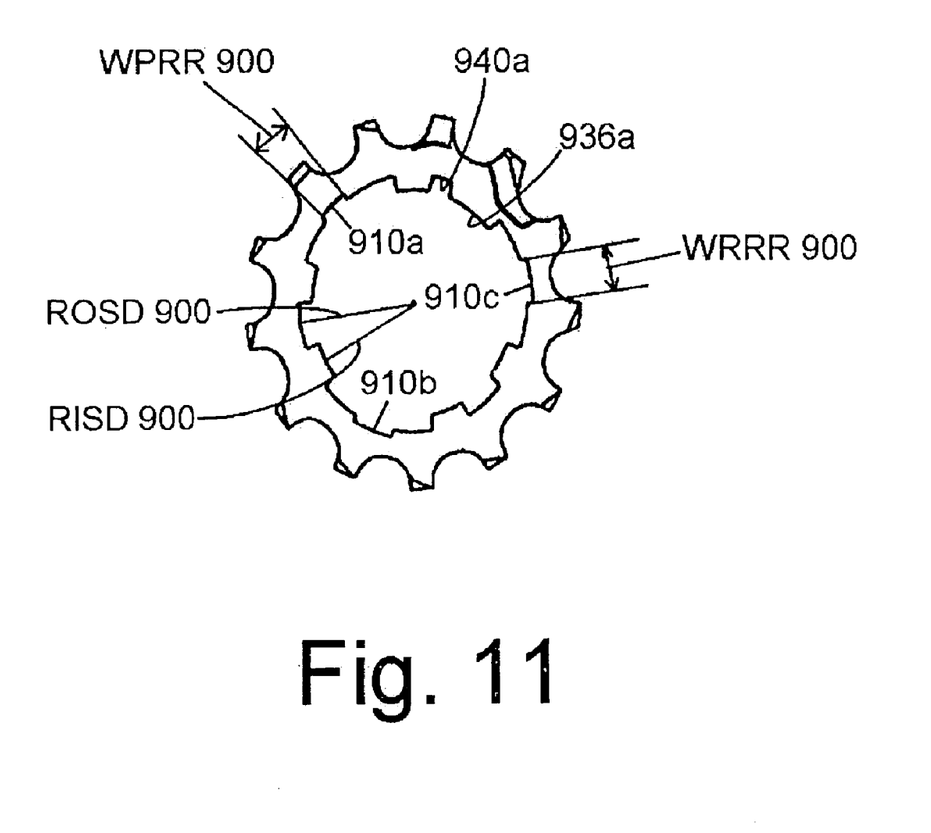
FIG. 11 is a view of another embodiment of a thirteen-tooth sprocket.

FIG. 10(a) is a rear view of another embodiment of a twelve-tooth sprocket 800, FIG. 10(b) is a partial cross-sectional side view of sprocket 800, and FIG. 10(c) is a front view sprocket 800. FIG. 11 is a rear view of a thirteen-tooth sprocket 900 that may be used with twelve-tooth sprocket 800. Sprocket 800 is constructed the same as sprocket 500 shown in FIGS. 7(a)–7(c), except one of the three evenly spaced lateral projections 824a has a width WPLP800 that is different from the width WRLP800 of at least one of the other lateral projections 824b and 824c. In this embodiment, the width WPLP800 of lateral projection 824a is different from the widths WRLP800 of both of the other two lateral projections 824b and 824c, which have the same widths. It should be noted that radially inwardly extending positioning splines 836a and radially outwardly extending positioning splines 840a are still retained.

Sprocket 800 may be used with sprocket 900 shown in FIG. 11. Sprocket 900 is constructed the same as sprocket 600 shown in FIG. 8, except that at least one of the three evenly spaced lateral projection receiving recesses 910a, 910b and 910c has a width WPRR900 that is different from a width WRRR900 of at least one of the other lateral projection receiving recesses 910a, 910b and 910c. In this embodiment, the width WPRR900 of lateral projection receiving recess 910a is different from the widths WRRR900 of both of the other two lateral projection receiving recesses 910b and 910c, which have the same widths. The distances RISD800 and ROSD800 of sprocket 800 are the same as the distances RISD600 and ROSD600 of sprocket 600, respectively, so sprocket 800 is adapted to be mounted to the first outer peripheral surface portion 90 of sprocket support 74. Lateral projection 824a of sprocket 800 may mesh with lateral projection receiving recess 910a of sprocket 900, and the lateral projections 824b and 824c of sprocket 800 may mesh with lateral projection receiving recesses 910b and 910c of sprocket 900. This promotes a good coupling between sprockets 800 and 900, but at a predetermined position relative to each other. As with sprockets 500 and 600, radially inwardly extending positioning splines 836a, 840a and radially outwardly extending positioning splines 936a and 940a are still retained.

While the above is a description of various embodiments that include various inventive features, further modifications may be employed without departing from the spirit and scope of the present invention. For example, the inventive features noted should not be limited to the twelve- and thirteen-tooth sprockets described. While a plurality of lateral projections, radially inwardly extending splines and radially outwardly extending splines were disclosed, in some embodiments only one of any of the foregoing may be desirable. While a plurality of distinct lateral projections were disclosed, in other embodiments there may be a configuration where different radial widths or some other characteristic of a single lateral projection, for example, is desirable.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus on a particular structure or feature.

What is claimed is:

1. A sprocket support for a bicycle comprising:
   a first outer peripheral surface portion adapted to support an inner peripheral surface of a first sprocket for rotation around an axis, wherein the first outer peripheral surface portion defines at least one radially inwardly extending spline and at least one radially outwardly extending spline, wherein the at least one radially inwardly extending spline has a radially inner surface with a first radially inner distance from the axis, and wherein the at least one radially outwardly extending spline has a radially outer surface with a first radially outer distance from the axis;
   a second outer peripheral surface portion adapted to support an inner peripheral surface of a second sprocket for rotation around the axis, wherein the second outer peripheral surface portion defines at least one radially inwardly extending spline and at least one radially outwardly extending spline, wherein the at least one radially inwardly extending spline has a radially inner surface with a second radially inner distance from the axis, and wherein the at least one radially outwardly extending spline has a radially outer surface with a second radially outer distance from the axis;
   wherein the first radially outer distance is different from the second radially outer distance; and
   wherein the first radially inner distance is substantially equal to the second radially inner distance.

2. The sprocket support according to claim 1 further comprising a transition surface portion extending radially between the at least one radially outwardly extending spline of the first outer peripheral surface portion and the at least one radially outwardly extending spline of the second outer peripheral surface portion.

3. The sprocket support according to claim 2 wherein the transition surface portion is substantially perpendicular to at least one of the at least one radially outwardly extending spline of the first outer peripheral surface portion and the at least one radially outwardly extending spline of the second outer peripheral surface portion.

4. The sprocket support according to claim 3 wherein the transition surface portion is substantially perpendicular to both of the at least one radially outwardly extending spline of the first outer peripheral surface portion and the at least one radially outwardly extending spline at the second outer peripheral surface portion.

5. The sprocket support according to claim 1 wherein the first radially inner distance is less than the first radially outer distance and the second radially outer distance.

6. The sprocket support according to claim 1 wherein the first radially outer distance is less than the second radially outer distance, and wherein the first radially inner distance is less than the first radially outer distance and the second radially outer distance.

7. A sprocket support for a bicycle comprising:
   a first outer peripheral surface portion adapted to support an inner peripheral surface of a first sprocket for rotation around an axis, wherein the first outer peripheral surface portion defines a plurality of radially inwardly extending splines and a plurality of radially outwardly extending splines, wherein each of the plurality of radially inwardly extending splines has a radially inner surface with a first radially inner distance from the axis, and wherein each of the plurality of radially outwardly extending splines has a radially outer surface with a first radially outer distance from the axis;

a second outer peripheral surface portion adapted to support an inner peripheral surface of a second sprocket for rotation around an axis, wherein the second outer peripheral surface portion defines a plurality of radially inwardly extending splines and a plurality of radially outwardly extending splines, wherein each of the plurality of radially inwardly extending splines has a radially inner surface with a second radially inner distance from the axis, and wherein each of the plurality of radially outwardly extending splines has a radially outer surface with a second radially outer distance from the axis;

wherein the first radially inner distance of at least one of the plurality of radially inwardly extending splines of the first outer peripheral surface portion is substantially equal to the second radially inner distance of at least one of the plurality of radially inwardly extending splines of the second outer peripheral surface portion.

8. The sprocket support according to claim 7 wherein the first radially outer distance of at least one of the plurality of radially outwardly extending splines of the first outer peripheral surface portion is less than the second radially outer distance of at least one of the plurality of radially outwardly extending splines of the second outer peripheral surface portion.

9. The sprocket support according to claim 7 wherein the first radially inner distance of at least one of the plurality of radially inwardly extending splines of the first outer peripheral surface portion is less than the first radially outer distance of at least one of the plurality of radially outwardly extending splines of the first outer peripheral surface portion and is less than the second radially outer distance of at least one of the plurality of radially outwardly extending splines of tho second outer peripheral surface portion.

10. The sprocket support according to claim 7 wherein the first radially outer distance of each of the plurality of radially outwardly extending splines of the first outer peripheral surface portion is less than the second radially outer distance of each of the plurality of radially outwardly extending splines of the second outer peripheral surface portion.

11. The sprocket support according to claim 10 wherein the first radially inner distance of each of the plurality of radially inwardly extending splines of the first outer peripheral surface portion is substantially equal to the second radially inner distance of each of the plurality of radially inwardly extending splines of the second outer peripheral surface portion.

12. The sprocket support according to claim 11 wherein the first radially inner distance of each of the plurality of radially inwardly extending splines of the first outer peripheral surface portion is less than the first radially outer distance of each of the plurality of radially outwardly extending splines of the first outer peripheral surface portion and is less than second radially outer distance of each of the plurality of radially outwardly extending splines of the second outer peripheral surface portion.

13. The sprocket support according to claim 12 wherein the first radially outer distance of each of the plurality of radially outwardly extending splines of the first outer peripheral surface portion is substantially equal, and wherein the second radially outer distance of each of the plurality of radially outwardly extending splines of the second outer peripheral surface potion is substantially equal.

14. The sprocket support according to claim 13 wherein at least one of the plurality of radially outwardly extending splines of the first outer peripheral surface portion has a different circumferential width than another one of the plurality of radially outwardly extending splines of the first outer peripheral surface portion.

15. The sprocket support according to claim 14 wherein at least one of the plurality of radially outwardly extending splines of the second outer peripheral surface portion has a different circumferential width than another one of the plurality of radially outwardly extending splines of the second outer peripheral surface portion.

16. The sprocket support according to claim 13 wherein each of the plurality of radially outwardly extending splines or the first outer peripheral surface portion has substantially a same circumferential width as corresponding ones of the plurality of radially outwardly extending splines of the second outer peripheral surface.

17. The sprocket support according to claim 13 wherein each of the plurality of radially inwardly extending splines of the first outer peripheral surface portion has substantially a same circumferential width as corresponding ones of the plurality of radially inwardly extending splines of the second outer peripheral surface portion.

18. The sprocket support according to claim 13 wherein each of the plurality of radially outwardly extending splines of time first outer peripheral surface portion has substantially a same circumferential width as corresponding ones of the plurality of radially outwardly extending splines of the second outer peripheral surface, and wherein each of the plurality of radially inwardly extending splines of the first outer peripheral surface portion has substantially a same circumferential width as corresponding ones of the plurality of radially inwardly extending splines of the second outer peripheral surface portion.

19. The sprocket support according to claim 18 further comprising a transition surface portion extending radially between each of the of the plurality of radially outwardly extending splines of the first outer peripheral surface portion and its corresponding radially outwardly extending spline of the second outer peripheral surface portion.

20. The sprocket support according to claim 19 wherein each transition surface portion is substantially perpendicular to at least one of its corresponding radially outwardly extending spline of the first outer peripheral surface portion and its corresponding radially outwardly extending spline of the second outer peripheral surface portion.

21. The sprocket support according to claim 20 wherein each transition surface portion is substantially perpendicular to its corresponding radially outwardly extending spline of the first outer peripheral surface portion and its corresponding radially outwardly extending spline of the second outer peripheral surface portion.

* * * * *